United States Patent [19]
Klingelhofer

[11] Patent Number: 5,673,204
[45] Date of Patent: Sep. 30, 1997

[54] LOOPBACK VIDEO PREVIEW FOR A COMPUTER DISPLAY

[75] Inventor: Marc E. Klingelhofer, Redwood City, Calif.

[73] Assignee: Sun Microsystems, Inc.

[21] Appl. No.: 499,089

[22] Filed: Jul. 6, 1995

[51] Int. Cl.$^6$ .................................................. G07F 3/14
[52] U.S. Cl. ..................... 364/514 A; 348/578; 358/537
[58] Field of Search ..................... 364/514 A; 348/177, 348/578; 358/537

[56] References Cited

U.S. PATENT DOCUMENTS 5,162,904  11/1992  Beaulier et al. ........................... 455/4.1
5,440,683  8/1995  Nally et al. ................................ 395/162

Primary Examiner—Melvin Marcelo
Attorney, Agent, or Firm—Flehr Hohbach Test Albritton & Herbert LLP

[57] ABSTRACT

A video adapter and computer/video system generate a video output signal having a first format useable by other video equipment. This signal is then looped back through the video adapter to generate a signal in a second format suitable for previewing on a monitor or display. The video adapter includes at least first and second data rate changers (preferably FIFOs), a controller unit, and circuitry for scaling and color-space converting the computer-processed video into the second format. Externally provided video input is multiplexed to a rate-increasing FIFO whose output is coupled to an IOSIMM unit in the computer/video system for video processing, through a master rate-decreasing FIFO whose output is output-controlled, format-processed and provided as the first format output signal. The output-controlled signal is coupled to a scaler, color-space converter and passed to a master rate-increasing FIFO. The output from this FIFO is coupled to the loopback path, to the video adapter for processing into the second format for previewing. Various forms of externally-provided video, as well as internally generated or stored video may be processed for output and preview.

20 Claims, 2 Drawing Sheets

LOOPBACK VIDEO PREVIEW FOR A COMPUTER DISPLAY

FIELD OF THE INVENTION

The present invention relates generally to video processing systems, and more particularly to computer-based video processing systems that include a video preview function.

BACKGROUND OF THE INVENTION

Video editors, special effects generators, and other systems that process video provide a primary video output stream that will ultimately be displayed. A video system may, for example, be called upon to create a primary video stream that includes a fade from one video scene to a second video scene. The output from the video system may then be delivered to other video systems, perhaps for video recording, for video transmission, or the like.

To ensure that the desired effects are being satisfactorily created and delivered, it is helpful for the system user to see, or preview, the video being processed before the primary video stream is output. In conventional video processing systems, a preview function is obtained by providing an additional output connection (a "monitor output") that simply duplicates the primary output video stream. An external television monitor is then coupled to the monitor output.

Some video processing systems are implemented with a general purpose computer or workstation. The output video stream is created within the computer's dynamic random access memory ("DRAM") and proprietary hardware is used to output the video stream to other video systems. In computer-based systems, a portion of the computer display is often used for preview, although implementing the preview function requires substantial computer system resources. The loss of these resources hampers the ability of the computer central processing unit ("CPU") to generate the primary output video stream, as well as the ability to attend to primary video generation responsibilities.

Generating a preview in a computer-based video system typically involves several operations on the output video stream, which stream is stored field-by-field in the computer's memory. More specifically, unless it matches the computer display format, it is necessary to color-space-convert the output video stream to the color format of the computer display. This color-space-conversion step is computationally intensive and typically requires a 3×3 matrix multiplication per display pixel.

Depending upon the user application, the output video stream may require resizing to accommodate the computer display. This resizing step is also computationally intensive, and requires bilinear interpolation and digital filtering at rates approaching 20 million pixels per second. In some prior art systems, a specialized memory controller and/or graphics accelerator processor is provided to reduce degradation in CPU performance while resizing operations are carried out.

Either of these steps may be optional, but if required, either step may be performed first. Finally, the computer video stream is copied to the computer display controller, typically video random access memory ("VRAM"), from which it is displayed on the computer display unit.

Thus, there is a need for a mechanism to provide a preview function in a computer-based video system that does not make excessive demands upon computer resources. Such mechanism should provide any video scaling and color-space conversion necessary to provide a preview image on the computer system display.

The present invention provides such a mechanism.

SUMMARY OF THE INVENTION.

A video adapter and computer/video system output a video signal having a first format useable by other video equipment, and loop back this signal through the video adapter to generate a signal in a second format suitable for previewing on a monitor or display. The video adapter includes at least a master rate-increasing unit, a master rate-decreasing unit (preferably FIFOs), a controller unit, and circuitry for scaling and color-space converting the computer-processed video into the second, previewable, format. The computer system includes a CPU, main memory, persistent memory, an IOSIMM unit, a VSIMM unit, as well as a memory controller and graphics accelerator unit.

Externally provided video input is presented to the video adapter and switched to a rate-increasing FIFO whose output is coupled via a loopback path to an IOSIMM unit in the computer/video system for video processing. The processed data is then passed via the loopback path to a master rate-decreasing FIFO in the computer system. The FIFO output is passed through an output control unit, and then processed to insert timing and synchronization information, and to convert to a serial format. The resultant signal is in the desired video first output format, here D1 output.

The signal from the output control unit is MUX-coupled to the video scaler and color-space converter and passed to a master rate-increasing FIFO. The output from this FIFO is coupled via the loopback path to the IOSIMM unit in the video adapter. The data is coupled via the system buses to the VSIMM, whose output signal is in the second format and is provided to a display for previewing the video.

Alternatively, internally generated or stored video may be processed and previewed. The video data is coupled through the computer system memory bus, to the memory controller, through a SIMMBUS into main memory. The data then passes to the input of the master rate-decreasing FIFO. As above-described, the output of this FIFO is processed and converted to provide the output video signal in the first format, here D1 output format. The output control signal is caused by the CPU to be multiplex-coupled or switched during loopback to the video scaler and color-space converter, whose output passes to the master rate-increasing FIFO. As before, this FIFO output is coupled via the loopback path into the IOSIMM unit in the video adapter. After processing within the video adapter, a previewable signal in the second format is output to a video monitor or display.

Other features and advantages of the invention will appear from the following description in which a preferred embodiment has been set forth in detail in conjunction with the accompanying drawings.

DETAILED DESCRIPTION OF THE PREFERRED EMBODIMENTS

The present invention helps generate a first video signal in a desired video output format, e.g., a serial D1 format, and then uses that signal to generate a second video signal in a format displayable on a computer monitor or workstation display. The second signal is generated by looping back the first signal through much of the same hardware used to generate the first signal. The first video signal may be generated from within the invention, e.g., by executing an animation software program, or may be externally provided, e.g., from a video tape.

Figure 1:
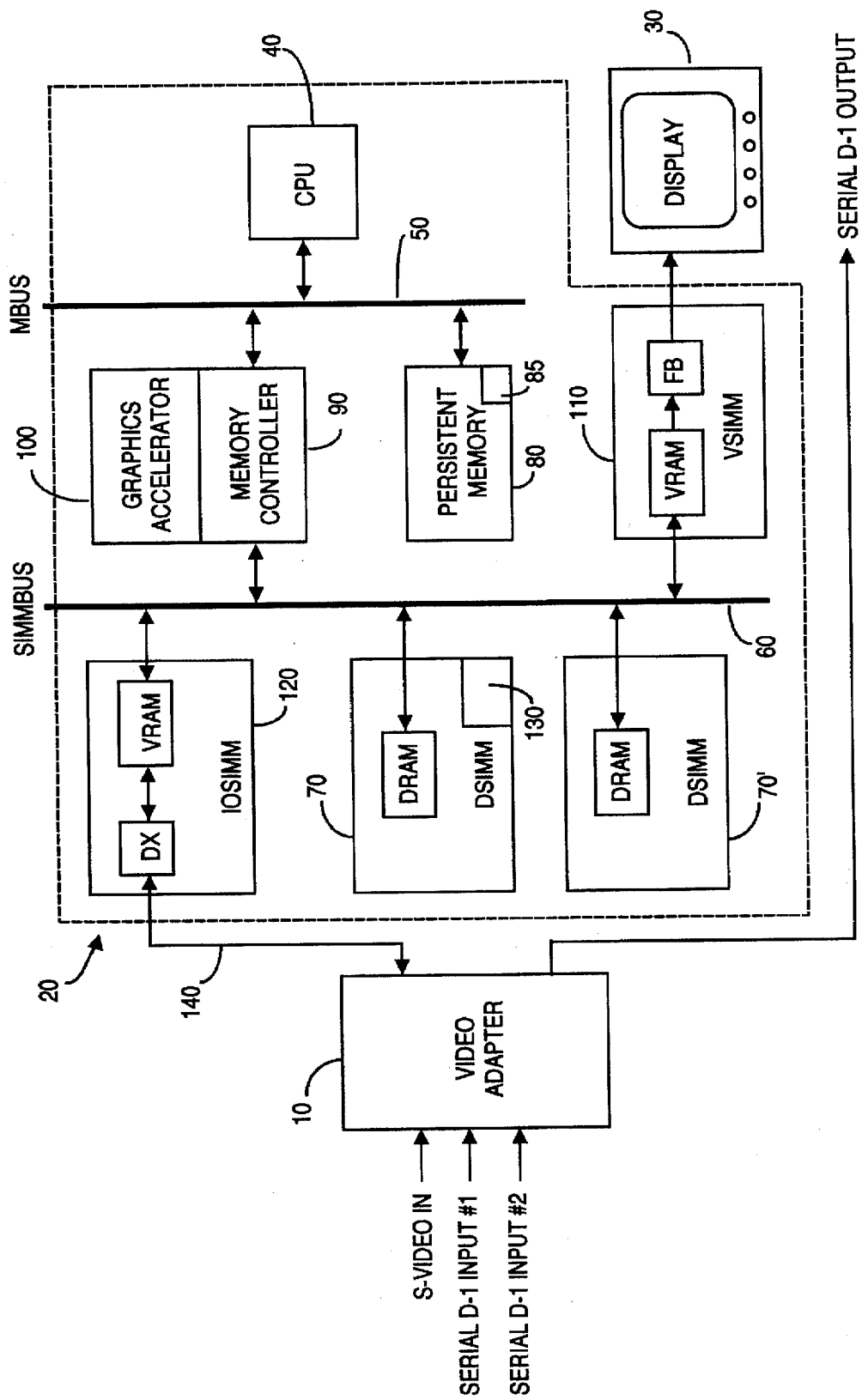
FIG. 1 is a block diagram of a computer-based video processing system that includes a video adapter, according to the present invention.

FIG. 1 depicts a video adapter 10 that is used with a computer or workstation-based video system 20 to provide a preview of processed video on the computer display 30, according to the present invention. Display 30 may be a computer monitor, but preferably is a workstation display that can preview the processed video in addition to displaying other windows of information.

Video adapter 10 generates a video output stream, here serial D-1 output, having a first video output format, and provides this signal to other video systems or peripheral devices. In the preferred embodiment, the D-1 output format has a transfer rate of about 27 MByte/second. A portion of this video output stream is also looped back through the video adapter 10 for processing and generation of the preview video output stream. The preview output stream has a second video output format suitable for preview display on display 30.

In the preferred embodiment, video system 20 was implemented about a Sun SPARCStation 20 (model SS20) computer system, manufactured by Sun Microsystems of Palo Alto, Calif. (The expressions video system 20 and computer system 20 will be used interchangeably herein.) The model SS20 includes a number of straight inline memory module ("SIMM") slots and S-Bus slots, into which memory or peripheral accessories may be plugged. Video system 20 includes a central processing unit ("CPU") 40, two busses MBUS 50 and SIMMBUS 60, DSIMM 70, 70' (preferably dynamic random access memory ("DRAM"), persistent memory 80, a memory controller 90, a graphics accelerator 100, a video processor unit 110 (which includes video memory VRAM and a frame buffer FB), and an IOSIMM unit 120 (which includes an accelerator DX and video memory VRAM). Collectively, main memory for computer/video system 20 includes the VRAM found in IOSIMM 120, as well as the DRAM found in DSIMM 70, 70'.

From the perspective of system 20, these VRAM and DRAM components function transparently and interchangeably. However, as shown in FIG. 1, while the IOSIMM 120 VRAM is directly coupled to data accelerator (DX) and then to lead 140, DRAM in DSIMM 70, 70' must be coupled via SIMMBUS 60 through the IOSIMM 120 and then into lead 140, for communication with the video adapter 10. For this reason, preferably VRAM in IOSIMM 120 is used whenever possible, rather than DRAM in units 70, 70'.

Storable within persistent memory 80 may be one or more executable software programs 85. One such program, upon execution by CPU 40, may be used to generate video including animation video. Such internally-generated video may be output as the D-1 output video and, after loopback processing, may be previewed on display 30. Alternatively, the video to be output as D-1 output and to be processed and previewed may be externally generated. Externally generated video is provided as input to the video adapter 10 and is typically in a serial D-1 input format.

Video adapter 10 was fabricated on a printed circuit board card that plugged into an S-Bus slot of the SPARCStation 20 for ease of mechanical mounting. Video adapter 10 did not, however, use the S-Bus data lines or control lines, although the S-Bus slot provided operating power and access to signal BNC, DIN and 80-pin connectors on the rear bulkhead of the SS20 chassis. Of course video adapter 10 may be used with other computer systems that include, perhaps by way of accessory card(s), the functions provided by the Sun IOSIMM card 120.

IOSIMM unit 120 is an accessory card manufactured by Sun Microsystems, Mountain View, Calif., that plugs into one of the SIMM memory slots on the SPARCStation 20 motherboard. The IOSIMM 120 unit provides a very high speed (e.g., 50 Mhz), 128 bit-wide data path to and from main dynamic random access memory ("DRAM") 70, 70' in computer/video system 20. IOSIMM 120 transfers data in bursts of 4 KBytes at a rate of about 80 MByte/second. In the preferred embodiment, the IOSIMM 120 VRAM buffers are NEC µPD482444 video RAM ICs, which have a storage capacity of about 0.5 MByte and an access time of about 70 ns.

In the context of FIG. 1, IOSIMM 120 functions to take video input data streams from video adapter 10 and to place such streams into system 20's main memory. Conversely, IOSIMM 120 also takes streams of video output data from block 20's main memory and provide such stream to video adapter 10. For example, IOSIMM 120 can read or write such video streams via the SIMMBUS into DRAM associated with DSIMM units 70, 70'. Of course, an equivalent mechanism otherwise implemented, could instead be used for IOSIMM unit 120.

Once the video stream data is in system 20 main memory, computer/video system 20 utilizes the memory controller 90, graphics accelerator 100 and VSIMM unit 110 to facilitate the processing and transfer of input and loopback video data to VSIMM unit 110. In general, memory controller 90, graphics accelerator 100, and VSIMM unit 110 collectively comprise a more specialized subsystem than would be found in a more generic computer system.

In the preferred embodiment, the frame buffer FB in video processor unit 110 was a Sun SX Graphics Framebuffer, which permits high quality video to be seen on display 30 in real-time at full resolution. This unit is especially useful for applications requiring display of video information from the video adapter on the host computer system's primary display 30. While an S-Bus display adaptor could be used instead, display resolution and rate of image update would suffer.

Externally generated video to be processed by system 20 is first input to video adapter 10. The various external video input signals may be broadcast quality and can arrive as continuous real-time input. These signals may come, for example, from peripheral devices such as video cameras, video tape recorders, perhaps another video processing system, or from other video sources.

In the embodiment shown in FIG. 1, video adapter 10 receives up to three externally generated input signals, and outputs a serial D-1 output signal. Video adapter 10 also outputs several signals to and receives several signals from the Sun IOSIMM unit 120, over an 80-pin connector having signal lines 140. Signal lines 140 may be up to about one meter in length, which permits video adapter 20 to be installed in any available S-Bus slot in a host SS20, or in an external S-Bus expansion chassis.

As presently implemented, video adapter 10 can receive one so-called S-video analog input, and two independent channels of Serial D-1 digital input video. The S-video input signal includes separate luminance and chrominance and is provided through a seven-pin DIN connector. Each channel of Serial D-1 video preferably is 4:2:2 component video conforming to the proposed SMPTE-259M format standard, and is provided through a BNC connector. In practice, the externally provided video to be processed and previewed will be in serial D-1 input format.

Using externally provided input video to video adapter 10, CPU 40 typically executes an application program 130 in main memory 70/70' to produce the desired video effects. Alternatively, graphics accelerator 100 operating under control of memory controller 90 may be used to create the desired video effects, and may be used to update information on display 30 from two incoming video streams.

The video processed by system 20 is output from a BNC connector through video adapter 10. In the present embodiment, the video output is a serial D-1 output signal that preferably is 4:2:2 component video in SMPTE-259M format. Although the output video signal is in a format suitable for other video systems, including video tape recording, it is not in a format suitable for preview upon display 30.

Video adapter 10 communicates bilaterally over signal lines 140 with the IOSIMM card 120. Within IOSIMM 120, a hardware accelerator ("DX") performs any necessary color-space conversion for the video being processed (but not for purposes of displaying the processed video on monitor 30). In the preferred embodiment, hardware accelerator DX is a Xilinx 4013 field programmable gate array ("FPGA") IC.

The VRAM buffers within IOSIMM 120 can store fields of RGB (red-green-blue) video that video adapter 10 outputs over lines 140. As noted, this video data can be copied from the IOSIMM VRAM across the SIMMBUS 60 into the VSIMM 110 VRAM. These IOSIMM 120 VRAMs can also can receive and store video data processed by computer system 20. Preferably these IOSIMM 120 VRAM buffers are configured by the software application 130 being executed by system 20. A suitable application, e.g., video fading, can dynamically enable allocation of as many VRAM buffers having required storage sizes for the video processing task at hand.

Once video data is in the IOSIMM 120 VRAM, the data may be operated upon as if they were system memory data stored in DSIMM DRAM memory modules plugged into the system 20 motherboard. Video data from the IOSIMM 120 VRAM may be copied across the SIMMBUS 60 bus and into the video ram ("VRAM") buffers in video subsystem VSIMM 110. For example, CPU 40 and the graphics accelerator 100 may copy and process the data via the memory controller 90. Communication in the preferred embodiment was over the SIMMBUS bus 60 within computer system 20, although similar data paths are provided in other computer systems.

Double buffering preferably is provided in the IOSIMM 120 VRAM and in the VSIMM subsystem 110 VRAM to avoid image tearing. More specifically, when a video field has been received in IOSIMM 120 from the video adapter 10, the IOSIMM VRAM buffer is frozen, and the buffer contents are copied into the unused VRAM buffer in VSIMM 130. While copying, new incoming video from video adapter 10 is stored into the second IOSIMM 120 VRAM buffer for that video input. During the next VSIMM 110 vertical retrace time, once the video copy is complete, the contents of the VSIMM 110 VRAMs are swapped.

Video system 20 allows two video inputs to be merged in real-time to produce visual effects such as blends, wipes, chroma keying, and matting. The video processed effect can be copied via SIMMBUS 60 to VSIMM 130 VRAM for viewing on display 30. Also the video processed effect can be sent out via video adapter 10's serial D-1 output, to another video system, a video tape recorder, or other peripheral device. Video images may be frozen into persistent memory 80 and later painted or warped in non-real time.

Figure 2:
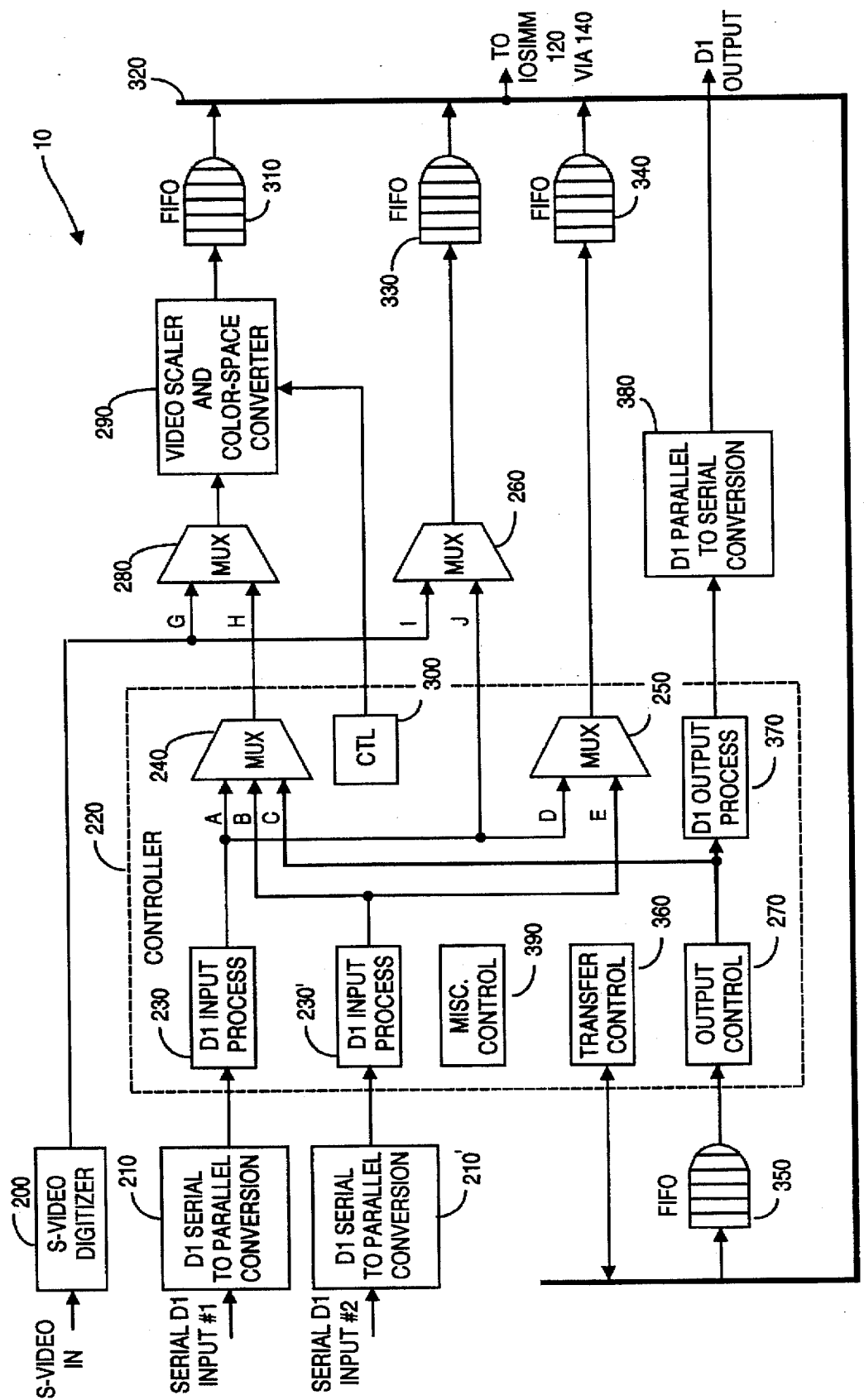
FIG. 2 is a block diagram of a video adapter, according to the present invention.

FIG. 2 provides a detailed block diagram of video adapter 10. As will be described, a portion of video adapter 10 is directed to providing a signal path for incoming video that is input to IOSIMM 120 for video processing by CPU 80. This incoming video is eventually output as processed video D-1, e.g., as a first video stream in a first format. Another portion of video adapter 10 is directed to providing a color-space-converted and scaled representation of the processed video for user viewing on display 30, e.g., as a second video stream in a second format. The present invention advantageously provides the second video stream by looping back part of the first video stream through some of the very hardware used to process the first input stream.

As noted, video adapter 10 can receive three independent video channels of input data: S-video, and two channels of serial D-1 video. Any incoming analog S-video signal has synchronization and timing information regenerated, and the active video stream converted to a digital stream by digitizer unit 200. In the preferred embodiment, the S-video digitizer 200 was a Philips SAA7110 video decoder IC, although other circuits could instead be used.

The two serial D-1 digital video signals are converted to parallel format by serial-to-parallel converter units 210, 210', preferably Sony SBX 1602A ICs. The then parallel formatted D-1 signals, which have a data rate of 27 MByte/second, are input to a controller unit 220. Controller 220 preferably is implemented using a Xilinx 4013 FPGA IC. Unit 220 includes sub-units 230, 230', 240, 250, 270, 300, 360, 370, and 390, all of which are also implemented with the same Xilinx 4013 FPGA IC. Unit 390 facilitates communications between the other units within controller 220, including providing reset and initialization functions.

Within controller unit 220, the 27 MByte/second D-1 signal streams have synchronization and time information regenerated and active video data extracted by respective input process circuitry 230, 230'. Because timing or synchronization information has been stripped out, the nominal data rate at the output of unit 230 or unit 230' is reduced to approximately 20 MByte/second.

Output from unit 230 is coupled as input to multiplexers 240, 250, and 260, and output from unit 230' is also coupled as input to multiplexers 240 and 250. (If a serial D1 input signal is not present as an input, a recipient MUX operates simply as a pass-through unit.) Multiplexers 240 and 250 are also coupled to the output of output control unit 270. Unit 270 is an interface output control unit that helps pull data from a first-in first-out ("FIFO") unit 350. Data into and out of control unit 270 is at 20 MByte/second.

Although the term "multiplexers" is used herein, units 240, 250, 260 and 280 are actually used as switches. For ease of following signal flow, the inputs to these multiplexers or switches are labelled alphabetically. Table 1 and Table 2 presented later herein will refer to these alphabetic pin designations.

FIFO 350 (like FIFOs 310, 330, 340) preferably is an Integrated Devices Technology IDT 72831 dual 2 KBytes, 9 position synchronous FIFO IC. The various FIFO units each change the rate of data transfer from FIFO input to FIFO output. As will be described, FIFO 350 is termed a master data rate decreasing FIFO, reducing data flow from 80 MByte/second to 20 MByte/second. FIFO 310 is termed a master rate-increasing FIFO, increasing data rate from about 40 MByte/second to 80 MByte/second, and FIFOs 330 and 340 each increase data rate from 20 MByte/second to 80 MByte/second. It is understood that these data rates are nominal figures.

The signal path from unit 270 to MUX 240 and 250 is depicted in FIG. 2 with a heavier line to indicate that signals from unit 270 are always present on this path. By contrast, signals from 230 or 230', if present, are not used by MUX 240 or MUX 250 or MUX 260 during signal loopback, looping back being controlled by CPU 40.

MUXs 250 and 260 (as well as MUX 280) are preferably implemented using the single Xilinx 4013 FPGA unit that is used to implement controller unit 220 an output signals at approximately 20 MByte/second. To reduce parts count, in the preferred embodiment, MUX 260 and MUX 280 were tristate outputs from the Xilinx 4013 FPGA, with 8-bit 74574 type tristate registers in series with the output from S-video digitizer 200.

Output from unit 270 is coupled to a D1 output process unit 370, which handles format and timing insertions to create D-1 formatted video. Whereas data entered unit 370 at 20 MBytes/second, after insertion of timing and synchronization information, data is output from unit 370 at 27 MByte/second, e.g., at a D-1 output flowrate.

As noted, unit 370 is preferably part of the Xilinx 4013 FPGA used to implement unit 220. Unit 370 handles some interfacing for delivery of the video stream to other video processing systems or devices. The parallel output from unit 370 is converted to serial format by unit 380, preferably a Sony SBX1601A D-1 video parallel to serial converter IC. The unit 370 output is provided as the D1 output signal to whatever peripheral devices, video recorders, other video systems, etc. may require the video processed signal.

The multiplexed output from multiplexer 240 and the output of the S-video digitizer 200 are both input to a multiplexer ("MUX") 280, whose output is input to a preferably Philips SAA7186 video scaler and color-spacer converter IC unit 290. A control logic unit 300 provides signals that control timing and operation for video scaling and color-space conversion by unit 290. The output from unit 290 has a data rate of about 40 MByte/second.

The output from multiplexer 250 is coupled as input to a FIFO 340, whose FIFO output is coupled to the loopback path 320. Path or bus 320 operates at a nominal 80 MByte/second data rate, and carries video pixel information but not synchronization information.

As further shown in FIG. 2, the S-video digitizer 200 output and the output from unit 230 are both input to a MUX 260, whose output is provided as input to a FIFO 330. The FIFO 330 output is coupled to the loopback path 320, and thus, via lead 140, to the IOSIMM 120.

Leads 140 and bus 320 carry time-multiplexed signals at nominally 80 MBytes/second, and communicate with only one of FIFOs 310, 330, 340 and 350 at a time. At a minimum, FIFOs 310 and 350 must be present to provide loopback. However, if it were desired to economize the present invention by eliminating any or all of the three externally provided video input ports, FIFOs 330 and 340 could be eliminated. The resultant economized system would, however, be limited to creating video effects and previews for imagery generated from or by software 85, or otherwise loaded into persistent memory 80 (or volatile memory in system 20).

Converter 290 provides D-1 ($YC_RC_B$)-to-RGB conversion for signal processed video (e.g., for video to be provided on the D-1 output port), and for video to be previewed on monitor 30. Converter 290 also provides image size scaling, as necessary, to display signal processed video on monitor 30, and generates the preview displayable video signal. In the present embodiment, the maximum size window that is provided as D1-output is 720 pixels horizontal by 585 pixels vertical, and the minimum is 16 pixels horizontal by 16 pixels vertical. Converter 290 scales downward, and can provide window to display 30 that is the lesser of the input window size or 16 pixels horizontal by 16 pixels vertical.

The output of converter 290 is input to a FIFO register 310, which provides a data rate altering function. More specifically, the data rate output by unit 290 has an RGB output format rate of about 40 MByte/second), whereas the data rate at the output of FIFO 310 is made to be 80 MByte/second. This resultant 80 MByte/second signal is coupled to a loopback path 320, an extension of which is line 140 (as shown in FIG. 1), and thus back to IOSIMM 120.

As noted, at a minimum FIFOs 310 and 350 must be present for functioning of the present invention. FIFO 310 input is at 40 MByte/second and FIFO 350 output is at 20 MBytes/second, which implies that the minimum data rate for bus 320 must be at least 40+20=60 MBytes/second. Indirectly, CPU 40 operating through IOSIMM 120 can command video adapter 10 to increase this rate, and in the preferred embodiment a nominal 80 MByte/second rate is used.

As shown in FIG. 2, loopback path 320 couples the outputs from FIFOs 310, 330, 340 to the input of an input FIFO 350. Controller 220 includes a transfer control unit 360, preferably implemented with the same FPGA comprising unit 220. Unit 360 facilitates data communications with IOSIMM 120, bus 320 and lead 140. Unit 360 together with IOSIMM 120 controls how the various FIFOs interact with bus 320 and lead 140, and learn when data on the bus is specific to them.

Output from FIFO 350 is coupled to the output control unit 270, whose output in turn is coupled to multiplexers 240 and 250, and to a D1 output process unit 370.

Overall, operation of the present invention is as follows. System 20 processes video, and the processed video is placed in the computer main memory DRAM 70, 70'. This video data is then coupled via SIMMBUS 60 to IOSIMM 120 for copying into the IOSIMM VRAM buffers. The data is then coupled out of unit 120 over line 140 including path 320 into the video adapter 10, more specifically, into FIFO 350. Controller 220 then causes transfer of the output video stream from FIFO 350 through output control 270 into D1 output process 370. The output from unit 370 is passed through D1 parallel to serial conversion unit 380 and to the D1 output connector, which provides the processed video to the outside world. The same output from unit 370 is also input to multiplexer 240, which is the beginning of the loopback configuration.

Controller 220 transfers the video output stream through the multiplexer 240 and through multiplexer 280, to the video scaler and color-space converter 290. After converter 290 performs any color-space conversion and resizing necessary, the preview display output image is input to FIFO 310.

The preview display video from FIFO 310 is then output to loopback line 320 (one of the lines 140) and is transferred to the IOSIMM 120 unit VRAM (see FIG. 1). The preview output video is copied from IOSIMM 120 VRAM via SIMMBUS 60 to the video memory VRAM in VSIMM 110.

The VSIMM 110 output is then coupled to the input of the computer display 30, for previewing by the system user.

Table 1 depicts multiplexer switch settings for all possible loopback preview modes. Table 2 depicts a subset of the multiplexer switch settings for non-loopback preview mode operation. Capital letter entries within the Table 1 and Table 2 refer to inputs of MUXs 240, 250, 260 and 280.

TABLE 1

|  | MUX240 | MUX280 | MUX260 | MUX250 |
| --- | --- | --- | --- | --- |
| Without Video Input | C | H | Open | Open |
| S-Video Input Only | C | H | I | Open |
| D-1 Input #1 only | C | H | J | Open |
| D-1 Input #1 only | C | H | Open | D |
| D-1 Input #2 only | C | H | Open | E |
| S-Video and D-1 Input #1 | C | H | I | D |
| S-Video and D-1 Input #2 | C | H | I | E |
| D-1 Input #1 and D-1 Input #2 | C | H | J | E |

The third and fourth rows in Table 1 denote the two acceptable configurations for D-1 input #1 video only.

TABLE 2

|  | MUX240 | MUX280 | MUX260 | MUX250 |
| --- | --- | --- | --- | --- |
| S-Video Input only[1] | Open | Open | I | Open |
| S-Video Input only[2] | Open | G | Open | Open |
| D-1 Input #1 only[3] | Open | Open | J | Open |
| D-1 Input #1 only[4] | Open | Open | Open | D |
| D-1 Input #1 only[5] | A | H | Open | Open |
| D-1 Input #2 only[6] | Open | Open | Open | E |
| D-1 Input #2 only[7] | B | H | Open | Open |
| S-Video and D-1 Input #1[8] | Open | Open | I | D |
| S-Video and D-1 Input #1[9] | A | H | I | Open |
| S-Video and D-1 Input #1[10] | Open | G | J | Open |
| S-Video and D-1 Input #1[11] | Open | G | Open | D |
| All three inputs active[12] | B | H | I | D |
| All three inputs active[13] | A | H | I | E |
| All three inputs active[14] | Open | G | J | E |

[1]Basic S-Video Input.
[2]S-Video Input with scaling and/or color-space conversion.
[3]One of two acceptable configurations for basic D-2 Input #1.
[4]Other acceptable configuration for basic D-1 Input #1.
[5]D-1 Input #1 with scaling and/or color-space conversion.
[6]Basic D-1 Input #2.
[7]D-1 Input #2 with scaling and/or color-space conversion.
[8]Basic S-Video Input and D-1 Input #1.
[9]Basic S-Video Input and D-1 Input #1 with scaling and/or color-spaced conversion.
[10]One of two acceptable configurations for basic D-1 Input #1 and S-Video Input with scaling and/or color-space conversion.
[11]Other acceptable configuration for basic D-1 Input #1 and S-Video with scaling and/or color-space conversion.
[12]Basic S-Video Input, Basic D-1 Input #1, and D-1 Input #2 with scaling and/or colorspace conversion.
[13]Basic S-Video Input, basic D-1 Input #2, and D-1 Input #1 with scaling and/or colorspace conversion.
[14]Basic D-1 Input #1, basic D-1 Input #2, and S-Video Input with scaling and/or space conversion.

Having described the overall operation of the present invention, operation will now be described for each of the two video-input scenarios: video generated by or available within system 20, and externally provided video.

Assume first that the video to be processed and previewed is generated by system 20, e.g., by CPU 40 executing a software routine 85, perhaps stored in persistent memory 80 or in volatile main memory. The video generated by routine 85 may include animation sequences, upon which video effects are to be performed. Alternatively, software 85 could include images generated elsewhere (including images from other systems) and loaded into memory for non-realtime effect-processing. Thus, software 85 can generate imagery, or manipulate existing imagery. If desired, software 85 could include a routine to control IOSIMM 120 so as to command a loopback preview mode.

The video data may be coupled via MBUS 50, through controller 90 to SIMMBUS 60, and into VRAM in IOSIMM 120. Alternatively, the video data could first be stored in DRAM associated with DSIMM 70 and/or 70'. As shown by FIG. 1, the data then passes through leads 140 into the video adapter 10, more specifically into the input of FIFO 350 (see FIG. 2). FIFO 350 is always present and actively functioning during loopback, and provides a data rate change function, the input data rate being 80 MByte/second and the FIFO 350 output data rate being 20 MByte/second. Output control 270 then takes the reduced data rate output from FIFO 350, and unit 370 processes the data into parallel D-1 format, which it outputs at 27 MByte/second. After parallel-to-serial conversion by unit 380, the computer-generated video is provided as D1 output at 27 MBytes/second.

As shown in Table 1, row 1, no externally-provided video is being input in this first scenario, MUXs 250 and 260 are inoperative, as are associated FIFOs 330, 340. MUX 260 is inoperative because both inputs are absent. Although MUX 250 has one active input (e.g., the output from unit 270), MUX 250 is commanded to be inoperative as it would be redundant to loopback this signal because its data have not been processed by unit 290. MUX 240 passes the output signal from unit 270 through MUX 280 for processing by unit 290.

The resultant unit 290 output signal is rate converted by FIFO 310 from 40 MByte/second to 80 MByte/second, and is looped back through path 320, through lead 140 and into IOSIMM 120. The SIMMBUS 60 then couples the data from VRAM in IOSIMM 120 to VRAM in VSIMM unit 110, and then to display 30 for previewing. As noted, neither FIFO 330 nor FIFO 340 plays a role in outputting or in previewing the computer provided video in this scenario.

Consider now the scenario where the video to be processed and previewed is externally provided from S-video input, serial D1 input #1 or #2, or by a combination of two of these three video inputs to video adapter 10. If it is desired to simultaneously accommodate three video input sources, it would be necessary to add one additional FIFO to video adapter 10 in loopback preview mode.

As shown in Table 1, the columns for MUX 240 and MUX 280 always shown positions C and H. Thus, regardless of the external video source, during loopback operation, CPU 40 prevents MUX 240 from using any output from unit 230 or from unit 230'. Further, during loopback operation, CPU 40 always causes MUX 280 to select the output from MUX 240, which in turn is instructed by CPU 40 to select the 20 MByte/second output from unit 270.

Assume first that S-video in is the sole video input to video adapter 10. As shown in FIG. 2 and Table 1, row 2, within video adapter 10, the output from S-video digitizer 200 passes from MUX 260 at 20 MBytes/second to FIFO 330, whose 80 MByte/second output is coupled to path 320, to leads 140 to IOSIMM 120 in system 20.

From VRAM within IOSIMM 120, data enters SIMM-BUS 60, where it may be copied to DRAM in DSIMM 70, 70', for processing by memory controller 90, by graphics accelerator 100, and/or by CPU 40. Via SIMMBUS 60 and MBUS 50, the processed data is returned and stored as a new sequence of processed video in system 20 main memory, e.g., VRAM in IOSIMM 120 and/or DRAM 70 in DSIMM 70, 70'. The data then is carried by leads 140 over bus 320 into FIFO 350 at 80 MByte/second. FIFO 350 outputs a 20 MByte/second stream to control unit 270, whose output passes through unit 370, which inserts timing and synchronization signals. The 27 MByte/second stream from unit 370 is converted to serial format by convert 380 and is provided as D1 output.

The output from unit 270 is also coupled to MUX 240, to MUX 280, whose output is scaled and color-space converted as necessary by unit 290. The 40 MByte/second output from unit 290 is rate converted to 80 MByte/second by FIFO 310 and coupled to path 320, to leads 140, to IOSIMM 120, SIMMBUS 60, VSIMM unit 110 for previewing on display 30.

Consider now the scenario in which the externally provided video is serial D1 input #1 video. As noted in Table 1, there are two acceptable configuration paths for passing D1 input #1 video to bus 320 and on to IOSIMM 120. In the first configuration, MUX 250 is open and MUX 260 receives input J, which is the output from D-1 input process 230. The 20 MByte/second output of MUX 260 is connected to the input of rate converter FIFO 330, whose 80 MByte/second output is coupled to bus 320. In the second configuration, MUX 260 is open and MUX 250 receives input D, the output from D-1 input process 230. The 20 MByte/second MUX 250 output is coupled to the input of rate converter FIFO 340, whose 80 MByte/second output is coupled to bus 320.

As described above for S-video input, the data flows over leads 140 to video adapter 10 and enters VRAM in IOSIMM 120 and flows over SIMMBUS 60 for processing by controller 90, graphics accelerator 100, and/or by CPU 40. The processed data in returned via SIMMBUS 60 to VRAM in IOSIMM 120, via leads 140, path 320 and into FIFO 350 at 80 MByte/second. FIFO 350 outputs a 20 MByte/second stream to control unit 270, whose output passes through unit 370, which inserts timing and synchronization signals. The 27 MByte/second stream from unit 370 is converted to serial format by converter 380 and is provided as D1 output. In this fashion, serial D1 input #1 video as processed by software 85 will have been converted to D1 output format for use by other equipment or systems.

The output from unit 270 is also coupled to MUX 240, to MUX 280, whose output is scaled and color-space converted as necessary by unit 290. The 40 MByte/second output from unit 290 is rate converted to 80 MByte/second by FIFO 310 and coupled to path 320, to leads 140, to IOSIMM 120, SIMMBUS 60, and VSIMM unit 110. In this fashion, serial D1 output video, which is serial D1 input #1 video after processing by software 85, is previewed on display 30.

Modifications and variations may be made to the disclosed embodiments without departing from the subject and spirit of the invention as defined by the following claims.

What is claimed is:

1. A system for internally providing video data for output in a first format and for processing said data for output in a previewable second format, the system useable with a computer processing sub-system that includes a central processor unit (CPU) and a memory coupled to said CPU to store said video data and a video buffer unit coupled to receive said video data from said memory and to output a signal in said previewable second format, the system comprising:

a video adapter, coupled to said CPU, including:
a controller unit;
a master data rate-decreasing unit having an output coupled to an input of said controller unit;
a video scaling-color-space converting unit having an input coupled to an output of said controller unit;
a master data rate-increasing unit having an input coupled to an output of said video scaling-color-space converting unit and having an output that is fed back to an input of said master data rate-decreasing unit;
said CPU causing said video data to be coupled to said video adapter, said master data rate-decreasing unit, and said controller unit such that said controller unit outputs a video signal in said first format;
said controller unit further providing a signal to said video scaling-color-space converting unit, whose output is increased in data rate by said master data rate-increasing unit and coupled as an input to said computer processing sub-system for storage and coupling to said video buffer unit, said video buffer unit outputting a signal in said previewable second format.

2. The system of claim 1, wherein the internally provided video data includes at least one type of video data selected from the group consisting of (i) video data stored in memory in said computer processing sub-system, and (ii) video data generated by said CPU executing a program stored in memory in said computer processing sub-system.

3. The system of claim 1, wherein said system further includes said computer processing sub-system such that together said system and said computer processing sub-system form a video system.

4. The system of claim 1, wherein said memory stores at least one routine selected from the group consisting of (i) an animation sequence upon which video effects may be performed, (ii) externally-generated imagery upon which non-realtime effect processing may be performed, and (iii) a routine commanding a looped-back preview mode of said system.

5. The system of claim 1, wherein at least one of said master data rate-increasing unit and said master data rate-decreasing unit is a first-in-first-out (FIFO) register unit.

6. The system of claim 1, wherein said controller unit includes a D1 output process unit 370 that inserts format and timing components into a signal output by said master data rate-decreasing unit, and herein said video signal in said first format is D-1 format output video.

7. The system of claim 1, wherein said computer processing sub-system includes an IOSIMM unit having an accelerator and video memory, at least a portion of said video memory serving as said memory for said computer processing sub-system.

8. A system for receiving at least one externally-provided video signal to be output in a first format and to be output in a previewable second format, the system useable with a computer processing sub-system that includes a central processor unit (CPU) and a memory coupled to said CPU to store said video data and a video buffer unit coupled to receive said video data from said memory and to output a signal in said previewable second format, the system comprising:

a video adapter, coupled to said CPU, including:
a controller unit;
a master data rate-decreasing unit having an output coupled to an input of said controller unit;
a video scaling-color-space converting unit having an input coupled to an output of said controller unit; and
a master data rate-increasing unit having an input coupled to an output of said video scaling-color-space converting unit and having an output that is fed back to an input of said master data rate-decreasing unit.

9. The system of claim 8, wherein said computer processing sub-system includes a workstation, and an IOSIMM unit having an accelerator and video memory, at least a portion of said video memory serving as said memory for said computer processing sub-system.

10. The system of claim 8, wherein said externally-provided video signal is an S-video input signal; and wherein:

said CPU in preview mode causes said video signal to undergo processing and pass through said master data rate-decreasing unit and through said controller unit, said controller unit outputting a video signal in said first format;

said controller unit further providing an output signal from said master data rate-decreasing unit to said video scaling-color-space converting unit, whose output is increased in data rate by said master data rate-increasing unit and coupled as an input to said computer processing system for storage and coupling to said video buffer unit, said video buffer unit outputting a signal in said previewable second format.

11. The system of claim 10, wherein said CPU in non-preview mode couples said externally-provided video signal to a second data rate-increasing unit whose output is coupled to an input of said master data rate-decreasing unit and is also couples to said memory.

12. The system of claim 8, wherein said externally-provided video signal is a D-1 #1 input signal; and wherein:

said CPU in preview mode causes said video signal to undergo processing and pass through said master data rate-decreasing unit and through said controller unit, said controller unit outputting a video signal in said first format;

said controller unit further providing an output signal from said master data rate-decreasing unit to said video scaling-color-space converting unit, whose output is increased in data rate by said master data rate-increasing unit and coupled as an input to said computer processing system for storage and coupling to said video buffer unit;

said controller unit further coupling a processed-version of said D-1 #1 input signal to a second data rate-increasing unit whose output is coupled as an input to said computer processing sub-system for storage and coupling to said video buffer unit;

said video buffer unit outputting a signal in said previewable second format.

13. The system of claim 12, wherein said CPU in non-preview mode couples said externally-provided video signal to an input of said second data rate-increasing unit whose output is coupled to an input of said master data rate-decreasing unit and is also coupled to said memory.

14. The system of claim 8, wherein a first said externally-provided video signal is an S-video input signal and a second said externally-provided video signal is a D-1 #1 input signal; and wherein:

said CPU in preview mode causes said D-1#1 input video signal to undergo processing and pass through said master data rate-decreasing unit and through said controller unit, said controller unit outputting a video signal in said first format;

said controller unit further providing an output signal from said master data rate-decreasing unit to said video scaling-color-space converting unit, whose output is increased in data rate by said master data rate-increasing unit and coupled as an input to said computer processing system for storage and coupling to said video buffer unit;

said controller unit further coupling a processed-version of said S-video input signal to a second data rate-increasing unit whose output is coupled as an input to said computer processing system for storage and coupling to said video buffer unit;

said video buffer unit outputting a signal in said previewable second format.

15. In a video system comprising a computer processing sub-system that includes central processing unit (CPU), memory coupled to said CPU, a video buffer unit coupleable to said memory and outputting a signal in a previewable second format, said video system further comprising a video adapter, coupled to said CPU;

a method for processing video, whether externally input to said video adapter, stored in said memory, or generated by said computer processing sub-system, and for outputting said video in a first format and for outputting said previewable second format, the method including the following steps:

(a) processing said video in said computer processing sub-system and storing processed said video in said memory;

(b) feeding-back processed said video from said memory to said video adapter, and within said video adapter reducing a data rate of the fed-back video and format-processing the reduced data rate video for output as said first format signal;

(c) within said video adapter, size scaling and color-space converting, as necessary, the reduced data rate video and increasing a data rate of the resultant video signal;

(d) coupling said resultant video signal to an input of said video adapter for storage therein; and (e) outputting from storage in said video adapter said resultant video as said previewable second format video.

16. The method of claim 15, wherein said first format signal is D-1 serial output, and wherein said video adapter can receive as externally-input video signals at least an S-video input signal, a first serial D1 input signal, and a second serial D1 signal.

17. The method of claim 15, wherein said video adapter includes a controller unit, a master data rate-decreasing unit having an output coupled to an input of said controller unit, a video scaling-color-space converting unit having an input coupled to an output of said controller unit, and a master data rate-increasing unit having an input coupled to an output of said video scaling-color-space converting unit and having an output that is fed back to an input of said master data rate-decreasing unit, and wherein step (b) includes passing the said processed video through said video scaling-color-space converting unit.

18. The method of claim 15, wherein at least one of step (b) and step (c) includes varying said data rate with a first-in-first-out (FIFO) register.

19. The method of claim 15, wherein video to be processed stored in said memory or generated by said computer processing sub-system includes at least one type of video selected from the group consisting of (i) an animation sequence upon which video effects may be performed, (ii) externally-generated imagery upon which non-realtime effect processing may be performed, and (iii) a routine commanding a looped-back preview mode of said system.

20. The method of claim 15, wherein said computer processing sub-system includes a workstation and an IOSIMM unit.

* * * * *